United States Patent [19]

Shioiri

[11] Patent Number: 5,272,303
[45] Date of Patent: Dec. 21, 1993

[54] WELDING DEVICE WITH MOVABLE AND IMMOVABLE ELECTRODES FOR WELDING TUBES

[75] Inventor: Haruki Shioiri, Nagano, Japan

[73] Assignees: Kawasumi Laboratories, Inc.; Tiyoda Electric Co. Ltd., both of Tokyo, Japan

[21] Appl. No.: 859,127

[22] Filed: Mar. 27, 1992

[30] Foreign Application Priority Data

Apr. 2, 1991 [JP] Japan .................... 3-29090

[51] Int. Cl.⁵ .............................. H05B 6/58
[52] U.S. Cl. ......................... 219/10.73; 219/10.53; 219/10.81; 156/380.6; 156/380.4
[58] Field of Search ............... 219/10.81, 10.73, 10.53, 219/10.75, 230; 156/274.4, 274.6, 380.2, 380.3, 380.4, 380.5, 380.6, 380.7, 380.8

[56] References Cited

U.S. PATENT DOCUMENTS

| | | | |
|---|---|---|---|
| 3,171,374 | 3/1965 | Frenzel | 219/230 |
| 3,443,733 | 5/1969 | Parente | 219/230 |
| 3,690,994 | 9/1972 | Williams | 219/230 |
| 4,013,860 | 3/1977 | Hosterman et al. | 219/10.81 |
| 4,390,832 | 6/1983 | Taylor | 219/10.81 |
| 4,490,598 | 12/1984 | Minney et al. | 219/10.81 |

FOREIGN PATENT DOCUMENTS 54-43101 12/1979 Japan .

*Primary Examiner*—Philip H. Leung
*Attorney, Agent, or Firm*—Michael J. Striker

[57] ABSTRACT

A portable device for welding a heat weldable tube has a main body case, a first electrode supported on an end part of the main body case, a movable member arranged opposite to the end part of the main body case, a second electrode arranged on the movable member substantially opposite to the first electrode, a manipulation member for displacing the movable member forwardly and rearwardly with respect to the end part of the main body case, a first elastic member returning the manipulation member to a predetermined position when the manipulation member has been opened, and a second elastic member providing elasticity in a direction of movement of the movable member when the movable member moves toward the end part of the main body case by the manipulation member.

9 Claims, 4 Drawing Sheets

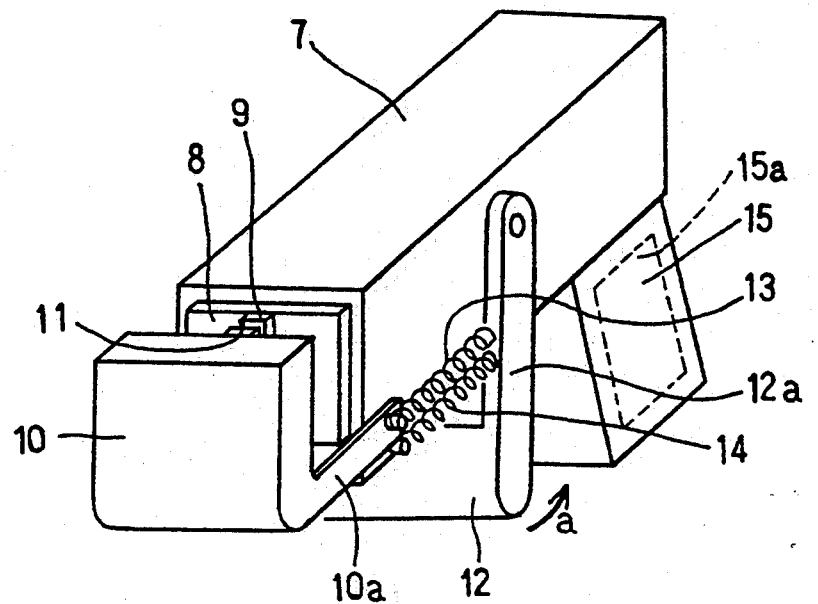
FIG_1
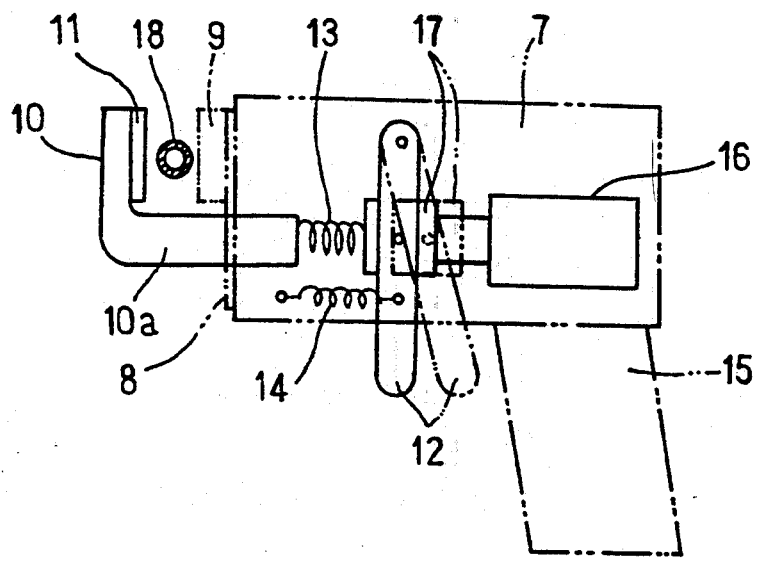
FIG_2

FIG_3
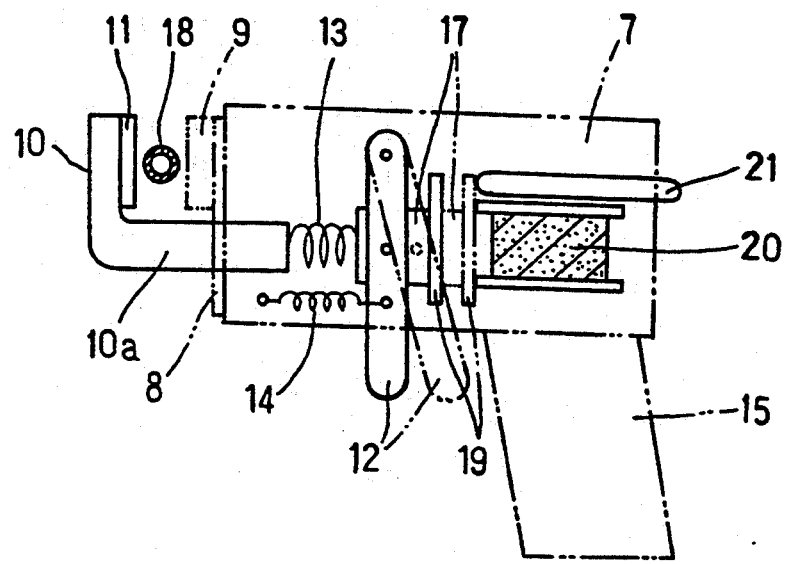
FIG_4
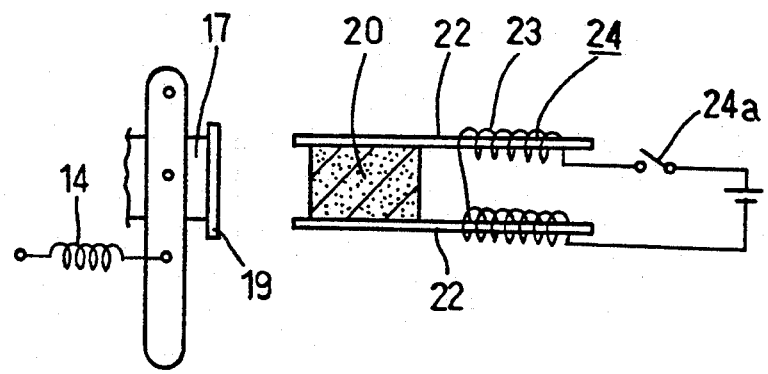

FIG_5
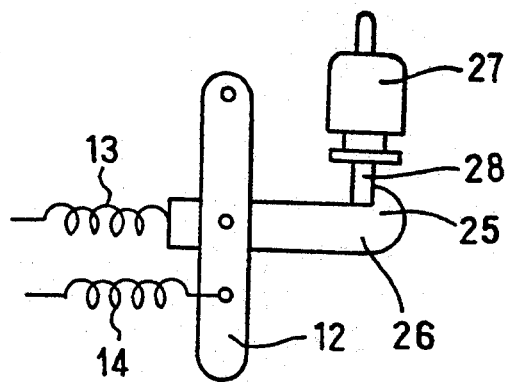
FIG_6
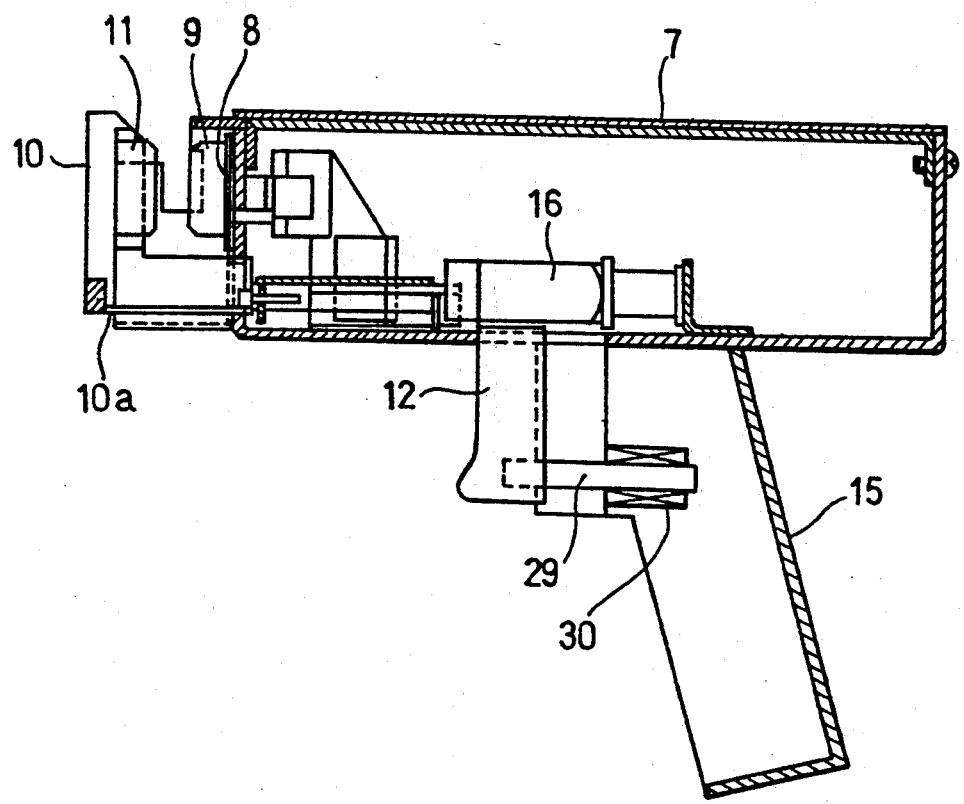

FIG_7
PRIOR ART
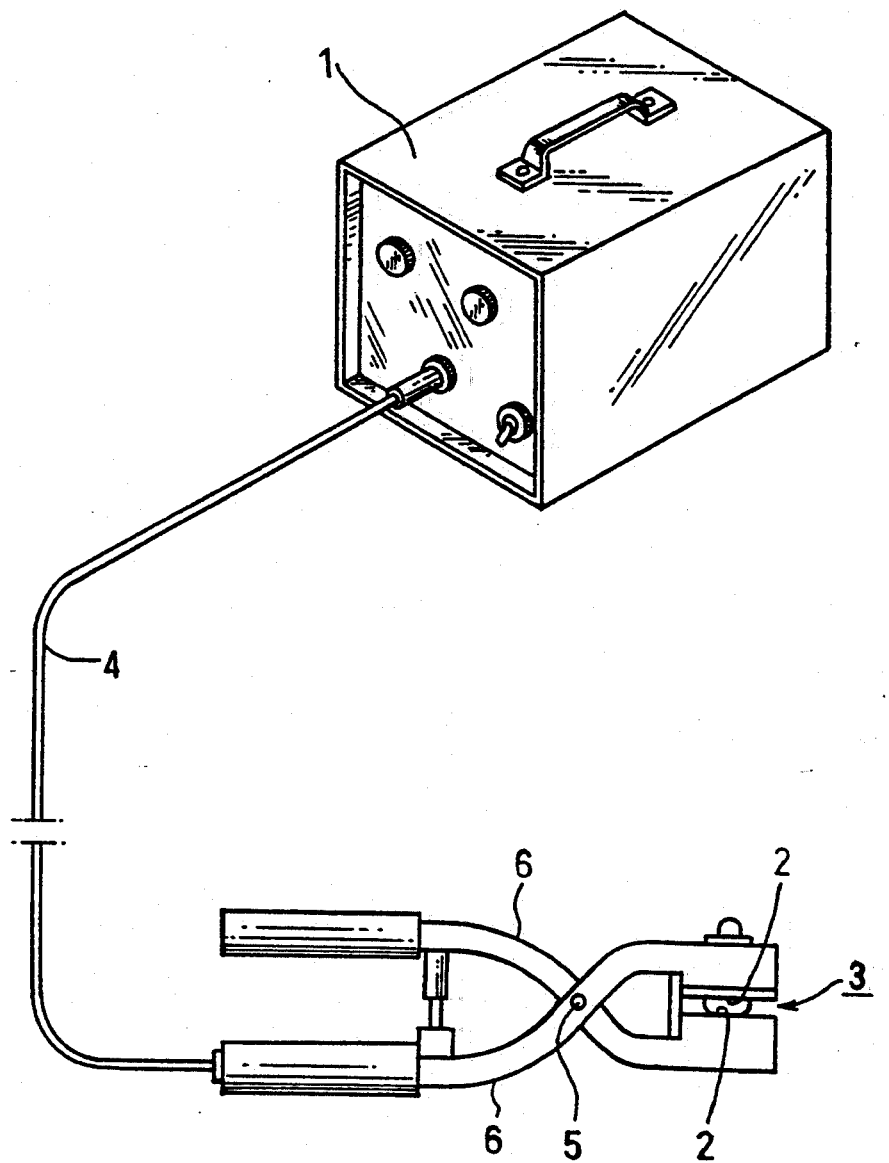

WELDING DEVICE WITH MOVABLE AND IMMOVABLE ELECTRODES FOR WELDING TUBES

The present invention relates to the improvement of a simple type welding device for tube in which middle part of a tube made of a heat weldable material such as vinyl, a synthetic resin, etc. is pressed, and is welded so that the internal passage of the tube is closed, and sure and stabilized welding is made possible by carrying out the welding of the tube with a uniform force.

For example, in the case when blood collecting procedure is carried out in a blood donating car or the like, a blood collecting bag constituted of a soft quality plastic material such as vinyl chloride and the like is used. A vinyl tube made of the same material as that of the blood collecting bag is connected to this blood collecting bag, and a blood collecting needle is connected to the tip of the tube.

In the case of collecting blood, the blood collecting needle is stung into blood tube of the blood donor, and the blood of the blood donor is absorbed into the blood collecting bag by making the inside of the case in which the above-described blood collecting bag is received in a negative pressure. When the blood of a predetermined amount has been absorbed in the blood collecting bag, blood collecting procedure is stopped, and the intermediate part of the above-described vinyl tube is closed. Thereby, the flow out of the blood in the blood collecting bag through the vinyl tube is prevented, and the entrance of external atmosphere into the blood collecting bag is made not to occur.

In order to shut the intermediate part of the vinyl tube and the like such as described above hermetically, a welding device utilizing the high frequency dielectric heating method has been hitherto used.

the vinyl tube welding device with use of the high frequency dielectric heating method is equipped with a pair of electrodes, and formed so that vinyl tube and the like are put between these electrodes, and high frequency current is supplied between both electrodes.

As a result, the vinyl tube put between both electrodes is heated by dielectric loss and temperature is raised, and the softened vinyl tube is pressed between the above-described one pair of electrodes and is welded.

A vinyl tube welding device with the high frequency dielectric heating method, and a comparatively simple construction is disclosed in the Japanese Utility Model Application Laid-Open No. 43101/1979.

This conventional welding device for tube is constituted, as shown in FIG. 7, of a control box 1 built-in with a high frequency wave generation source, a pair of levers 6 mutually displacing by making rotation axis 5 as the center, a pair of electrodes 2 and 2 (welding part 3) provided at the tip part of 6, and the cable 4 for connecting this welding part 3 to the above-described control box 1.

In the case of welding the tube, the intermediate part of the tube is put between the electrodes 2 and 2, and high frequency current is supplied from the control box 1 between the electrodes 2 and 2 through the cable 4. As a result, the vinyl tube or the like is softened by the heating due to the high frequency dielectrics and is pressed between the electrodes and welded.

According to this conventional device, the force applied to the levers 6 and 6 becomes the force of pressing the tube between pair of electrodes 2 and 2, and there is generated the difference of pressing force of the tue by the grasping force of the operator grasping the levers 6 and 6. Therefore, in the case of carrying out the welding of many tubes, fluctuation is generated in welding, and skill is required in order to carry out good welding safely.

SUMMARY OF THE INVENTION

An object of the present invention resides in proposing a welding device for tube which can always put the tube between with uniform force, and can weld the tube surely and in a stabilized state.

The welding device for tube of the present invention is a portable type device and is equipped with a first electrode supported on a end surface of the main body case;

a movable member set by counterposing to the end surface of the above-described main body case;

a second electrode supported at a position counterposing to the above-described first electrode in the above-described movable member;

a manipulation member for displacing the above-described movable member to forward and backward directions toward the end surface of the main body case;

a first elastic member for making said manipulation member return to a predetermined position, when the above-described manipulation member is released; and a second elastic member for endowing elasticity to the displacement direction of the above-described movable member, when the above-described movable member is made approach to the end surface direction of the main body case.

BRIEF DESCRIPTION OF DRAWINGS

FIG. 1 is a schematic perspective view for showing a first embodiment of the present invention.

FIG. 2 is a schematic side surface view for showing a second embodiment of the present invention.

FIG. 3 is a schematic side surface view for showing a third embodiment of the present invention.

FIG. 4 is a schematic essential part side view for showing a fourth embodiment of the present invention FIG. 5 is a schematic essential part side view for showing a fifth embodiment of the present invention.

FIG. 6 is an outline longitudinal sectional side view for showing another example of a lever support structure of the present invention, and FIG. 7 is a perspective view for showing an example of a conventional welding device for tube.

DESCRIPTION PREFERRED EMBODIMENTS

FIG. 1 shows a first embodiment of the present invention. This welding device for tube is equipped with a main body case 7, a movable plate 10, and a lever 12. In the inside of the main body case 7, a high frequency oscillation circuit (not shown in the figure) and the like are provided, and on one end surface 8 of that main body case 7, a first electrode 9 is supported.

On the lower end part of the movable plate 10, an arm part 10a is extruded. This arm part 10s is supported on the main body case 7 and is displaceable along the lengthwise direction of the main body case side surface part. On the inside surface of the movable plate 10, a second electrode 11 is provided at the part counterfacing to the first electrode 9.

The manipulation lever 12 has a support piece 12a with an end part pivoted on the side surface part of the main body case 7. A pulling spring 13 is provided between the intermediate part of this support piece 12a and the base end part of a movable arm part 10a. When the manipulation lever 12 is rotated in the direction of the arrow mark a of FIG. 1, the movable plate 10 displaces in the direction of the end surface 8 of the main body case, and the second electrode 11 elastically approaches the first electrode 9.

Also, between the main body case 7 and the middle part of the manipulation lever support piece 12a, another pulling spring 14 is provided and has an elastic force which is opposite to the direction to the arrow mark a. By the pulling spring 14, the manipulation lever 12 always return to a predetermined position. When the manipulation lever 12 returns to the predetermined position, the second electrode 11 separates from the first electrode 9 by a predetermined distance. Since he pulling spring 14 becomes in a closely adhered winding in free state, accompanying to the return of the manipulation lever 12, it pushes the movable plate 10, and makes the first and second electrodes 9 and 11 separated. The return position of the manipulation lever 12 is restricted by a stopper or the like not shown in the figure.

When the welding device for tube is operated, the manipulation lever 12 is manipulated in the state where the grip 15 is grasped.

While it is not shown in the figure, the movable plate arm part 10a can be provided at the opposite side of the movable plate 10, and in the same manner the pulling springs 13 and 14 can be provided on the opposite side of the main body case 7.

In the case when the intermediate part of the tube made of heat weldable material is welded by the welding device for tube shown in FIG. 1, after inserting the tube between the first electrode 9 and the second electrode 11, the manipulation lever 12 is rotated in the direction of the arrow mark a of FIG. 1. As a result, the movable plate 10 displaces to one end surface 8 of the main body case, and the intermediate part of the above-described tube is located between the second electrode 11 and the first electrode 9 supported on the inside surface of this movable plate 10.

In this state, since the prescribed elastic force accompanying to the elongation of the pulling spring 13 has been added to the tube, the tube becomes pressed with an approximately constant force, regardless of different strength of the rotational movement of the manipulation lever 12 provided by the operator. Also, for example, by providing a stopper or the like not shown in the figure, the displacement amount of the manipulation lever 12 can be suitably regulated.

When high frequency current is passed between the first and second electrodes 9 and 11 with the high frequency oscillation circuit provided in the main body case 7, the above described tube is heated and the temperature is raised, and it is pressed and welded between the above-described first and second electrodes 9 and 11.

After the tube has been welded and the force added to the manipulation lever 12 is released, the manipulation lever 12 is pulled back by the elastic force of the pulling spring 14 and the second electrode 11 and the first electrode 9 separate. The welded tube can be taken out from between both electrodes 11 and 9.

A second embodiment of the present invention is shown in FIG. 2. In this embodiment, an alternate mechanism 16 is provided in the main body case 7 for forming the welding device for tube. The mechanism 16 is hitherto build in the magnet catch provided in a sharp pencil, ball pen, various kinds of cabinet, etc. and repeats elongation and shrinkage corresponding to the compression force repeatingly added. In this mechanism 16 the total length shrinks when compression force is once added in the axial direction (left and right direction of FIG. 2), and when the compression force is added again the total length increases. In the mechanism 16, its end part (right end part in FIG. 2) is connected to the main body case 7, and its another part (left end part in FIG. 2) is connected to the connection piece 17 for connection to the pulling spring 13 pivoted on the intermediate part of the manipulation lever 12. The other structure of the welding device for tube is the same as that shown in FIG. 1.

The welding a tube made of a heat weldable material with the use of the welding device for tube of FIG. 2 is almost same as that in the case of the welding device for tube of the above-described first embodiment. After inserting the tube 18 between the first and second electrodes as shown in FIG. 2, the manipulation lever 12 is rotated with fingers so that the grip 15 is grasped, from the position shown by a solid line in FIG. 2 to the position shown with a chain line.

As a result, via the pulling spring 13 as a elastic member, the movable plate 10 is pulled, and the second electrode 11 supported on the inside surface of this movable plate 10 is displaced toward the first electrode 9. Then, the intermediate part of the tube 18 is put between the first and second electrodes 9 and 11, and the intermediate part of the tube 18 is welded by the above-described high frequency heating.

In the welding device for tube of FIG. 2, when the total length of the alternate mechanism 16 shrinks by rotating the manipulation lever 12 to the chain line position of FIG. 2, even after the release of the rotation force added to the manipulation lever 12 the manipulation lever 12 is supported in the chain line state of FIG. 2. Therefore, the second electrode 11 is pushed toward the first electrode 9 always with a constant force based on the elastic force of the pulling spring 13. As a result, the fluctuation of the welding of the tube becomes perfectly absent, and stabilized and sure welding can be always carried out.

When the desired position of the tube 18 has been welded, the manipulation lever 12 is operated once more, and pressing force is again added to the alternate mechanism 16 so that the mechanism 16 is elongated. As a result of elongation of the mechanism 16, the lever 12 is returned to the solid line position of FIG. 2 and the second electrode 11 separates from the first electrode 9.

FIG. 3 shows a third embodiment of the present invention. In this embodiment, a binding piece 17 is provided in the intermediate part of the manipulation lever 12, and an adsorption place 19 of a magnetic member made of iron or the like is mounted. Also, at a position counterposing to the adsorption plate 19 inside of the main body case 7, a permanent magnet 20 is mounted. The permanent magnet 20 has a magnetic force capable of supporting the adsorption plate 19 in the state as it has adsorbed this adsorption plate 19, regardless of the elastic force of the above-described pulling spring 14.

At the rear end part (right end part in FIG. 3) of the main body case 7, a pressing rod 21 as a releasing member extends in the axial direction (left and right direction in FIG. 3) and is free to displace. The rear end part of this pressing rod 21 is protruded from the rear end part of the above-described main body case 7, and by pushing this protruded part forward (left side in FIG. 3), the above-described adsorption plate can be pushed forward.

In the welding device for tube shown in FIG. 3, when the manipulation lever 12 is rotated to the chain line position of FIG. 3, the absorption plate 19 mounted on the binding piece 17 of the manipulation lever 12 is absorbed on the permanent magnet 20 after releasing the force added to the manipulation lever 12, the manipulation lever 12 is preserved at the position as it is. Therefore, the tube 18 is pressed with a constant force between the first and second electrode 9 and 11, and the welding of the tube 18 can be carried out without fluctuation and always in a stabilized state.

When the tube 18 has been welded, the rear end part of the pressing rod 21 is pushed forward, and the adsorption pale 19 is separated from the permanent magnet 20. As a result, the above-described manipulation lever 12 is returned to the position shown by a solid line in FIG. 3 by the elastic force of the pulling spring 14, and the second electrode 11 is separated from the first electrode 9. The structure of the welding device for tube and others are same with those in FIG. 1.

FIG. 4 shows a fourth embodiment of the present invention. In this embodiment, the pressing rod 21 in the above-described third embodiment was omitted, and in place of it, a coil 23 is wound on the iron cores 22 contacting the permanent magnet to form an electromagnet 24. By selecting the winding direction or current direction suitably, a magnetic field opposite to the magnetic field formed by the permanent magnet 20 is formed when the switch 24a is closed and current is supplied to the coil 23.

Therefore, when the adsorption of the adsorption plate 19 and the permanent magnet 20 is released and current is passed to the electromagnet 24, the magnetic field formed by the electromagnet 24 cancels the magnetic field formed by the permanent magnet 20, and the adsorption plate 19 separates from the permanent magnet 20. Structure and action other than that are the same as those of the above-described third embodiment.

As a variation example of the above-described fourth embodiment, the permanent magnet 20 is omitted, and the adsorption plate 19 is made capable of adsorbing only in the case of passing current to the electromagnet 24. During the release of current passage to the electromagnet 24, the adsorption of the adsorption plate 19 is released.

FIG. 5 shows a fifth embodiment of the present invention. In this embodiment, in the intermediate part of the manipulation lever 12, a hooking member 26 is pivoted, and in the rear end part (right end part of FIG. 5) of the hooking member 26 a nail part 25 is formed. Also, in the position corresponding to the hooking member nail part 25 of the main body case 7, a solenoid 27 for making release means is provided, and the stopper member 28 for displacing by the solenoid 27 is hooked to the hooking member nail part 25.

The stopper member 28 hooks to the hooking member nail part 25 during to the rotation of the manipulation lever 12 against the elastic force of the pulling spring 14 when current is not supplied to a solenoid 27. During the current passage to the solenoid 27, the stopper member 28 is displaced and the hook to the hooking rear part slips out.

According to the embodiment of FIG. 5, the force for pressing the first and second electrodes 9 and 11 (cf. FIGS. 1 to 3) relative to each other can be made always constant. Also, as the version example of FIG. 5, the apparatus can be formed so that when the distance between the first electrode 9 and the second electrode 11 has become less than a constant value, the solenoid 27 automatically passes current, and after completion of the welding the first and second electrodes 9 and 11 are automatically separated.

In any of the above-described embodiments, one end of the manipulation lever 12 is pivoted in the main body case 27. However as shown in FIG. 6, the apparatus can be also constructed in such a manner that a guide rod 29 fixed to the manipulation lever 12 is inserted into the thrust bearing 30 n the grip 15, and the manipulation lever 12 is linearly displaced. In FIG. 6 the upper end part of the manipulation lever 12 is connected to the alternate mechanism 16.

In FIG. 6 when the manipulation lever 12 is pulled with fingers to the right direction, the movable plate 10 provided with the second electrode 11 displaces to the right. After the tube to be welded is supported in the most suitable interval between the first and second electrode the high frequency is oscillated, and sealing is carried out. During the oscillation with the high frequency, it is displayed (not shown by the figure) with an emission diode (LED). When the emission diode is out of lights or discolored, the oscillation of the high frequency is finished and the sealing action is completed. By pulling the manipulation lever 12, the gap between the first electrode and the second electrode is released by the mechanism 16, and is returned to the original position.

In the above-described embodiments, the devices are provided with the high frequency oscillation circuit and an electric source circuit. The electric source part may be connected to an outside cable, but a small high performance battery capable of charging can be mounted also. For example, in FIG. 1, a battery mounting room 15a is provided in the main body case 15, and the battery can be arranged therein.

With the above-described welding device for tubes in accordance with the present invention, notwithstanding whether the operator is skilled or not, the tube can be held always with a uniform force, and a sure and stable welding can be carried out.

It will be understood that each of the elements described above, or two or more together, may also find a useful application in other types of constructions differing from the types described above.

While the invention has been illustrated and described an embodied in a welding device for tubes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various application without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A portable welding device for welding a heat weldable tube, comprising
   a main body case having a front face portion;
   an immovable electrode (9) fixed to said main body case (7) at said front face portion;
   a movable member (10) movable in direction of said front face portion;
   a movable electrode (11) provided at the movable member;
   a manipulation member pivotally connected to said main body case for moving said movable member toward said immovable electrode (9) of said main body case (7);
   tube compression means (13) connecting said movable member and said manipulation member and a predetermined space maintaining means (16) for holding, at a predetermined compression force, a tube between said movable electrode (11) and said immovable electrode (9) during welding the tube;
   recovering means (14) for said manipulation member for releasing said predetermined space maintaining means after having welded the tube, and recovering said manipulation member (12) to a predetermined position; and
   high frequency energy supply means connected to said immovable electrode and said movable electrode for supplying a high frequency energy to both said electrodes for a required time when holding the tube at a predetermined space through said movable electrode (11) and said immovable electrode (9).

2. The device as claimed in claim 1, wherein said tube compression means is an elastic member (13) connected between said manipulation member (12) and said movable member (10).

3. The device as claimed in claim 1, wherein said predetermined space maintaining means is an alternate mechanism (16) which alternately repeats contraction and expansion following a rotation of said manipulation member (12), and which, at contraction, holds said movable electrode (11) in relation with said immovable electrode (9) and, at expansion, separates said movable electrode (11) from said immovable electrode (9).

4. The device as claimed in claim 3, wherein said manipulation member (12) includes a guide rod (29) which is slidably inserted into a bearing part 30 provided within a grip of said main body case, and said manipulation member (12) is connected at its upper portion to said alternate mechanism.

5. The device as claimed in claim 1, wherein said predetermined space maintaining means is associated with said manipulation member (12), and has a binding member (17) provided with an absorption member (19), a magnet (20) disposed at a rear part of said case main body, and a releasing member (21) for separating said binding member (17) from said magnet (20) and holding said movable electrode (11) and said immovable electrode (9) at a predetermined space under a condition that said absorption member (19) of said binding member (17) attracts said magnet (20).

6. The device as claimed in claim 5, wherein said releasing member is an electromagnet (4) located in the vicinity of said magnet (20), and generating magnetism in opposition to said magnet (20).

7. The device as claimed in claim 5, wherein said magnet is an electromagnet to be attracted to said binding member (17) at passing a current, and the attraction is released at not passing the current.

8. The device as claimed in claim 1, wherein said predetermined space maintaining means includes an engaging mechanism for engaging said movable member (10) at a predetermined position when moving said movable member (10) toward an end part of the case, a solenoid (27) releasing an engagement between an engaging member (26) which is connected to said movable member (10) via an elastic member and movable with respect to said case main body due to rotation of said manipulation member (12), and a stopper member (28) to be engaged with said engaging member (26) by displacing said stopper member (28).

9. The device as claimed in claim 1; and further comprising a high frequency oscillation circuit, an electric source circuit and a battery mounting room provided within said main body case, said movable electrode (11) and said immovable electrode (9) being at certain space, a high frequency being automatically oscillated to start a sealing of the tube, and the high frequency oscillation is stopped after a certain time has passed.

* * * * *